(12) United States Patent
Takada

(10) Patent No.: US 10,468,989 B2
(45) Date of Patent: Nov. 5, 2019

(54) SWITCHING REGULATOR INCLUDING A CLAMP CIRCUIT

(71) Applicant: ABLIC Inc., Chiba-shi, Chiba (JP)

(72) Inventor: Kosuke Takada, Chiba (JP)

(73) Assignee: ABLIC INC., Chiba (JP)

( * ) Notice: Subject to any disclaimer, the term of this patent is extended or adjusted under 35 U.S.C. 154(b) by 0 days.

(21) Appl. No.: 16/151,954

(22) Filed: Oct. 4, 2018

(65) Prior Publication Data

US 2019/0109541 A1 Apr. 11, 2019

(30) Foreign Application Priority Data

Oct. 6, 2017 (JP) ................................. 2017-196188

(51) Int. Cl.
*H02M 3/158* (2006.01)
*H02M 1/08* (2006.01)
*H02M 1/00* (2006.01)
*H02M 3/156* (2006.01)

(52) U.S. Cl.
CPC ........... *H02M 3/1588* (2013.01); *H02M 1/08* (2013.01); *H02M 3/1563* (2013.01); *H02M 2001/0012* (2013.01); *H02M 2001/0025* (2013.01); *H02M 2003/1566* (2013.01)

(58) Field of Classification Search
CPC ...... H02M 3/155; H02M 3/156; H02M 3/158; H02M 3/1588; H02M 2001/0025; H02M 1/08; H02M 1/32; H02M 2003/1566; H02M 2001/0058
See application file for complete search history.

(56) References Cited

U.S. PATENT DOCUMENTS

| 7,382,114 B2 * | 6/2008 | Groom | H02M 3/157 |
| | | | 323/271 |
| 7,679,348 B2 * | 3/2010 | Sohma | H02M 3/156 |
| | | | 323/282 |
| 9,729,057 B1 * | 8/2017 | Goenawan | H02M 3/156 |
| 2007/0052403 A1 * | 3/2007 | Stoichita | G05F 3/242 |
| | | | 323/316 |
| 2009/0079408 A1 * | 3/2009 | Qiao | H02M 3/157 |
| | | | 323/283 |

(Continued)

FOREIGN PATENT DOCUMENTS

| JP | 2010-68671 | 3/2010 |
| JP | 4618339 | 11/2010 |

*Primary Examiner* — Gustavo A Rosario-Benitez
(74) *Attorney, Agent, or Firm* — Brinks Gilson & Lione

(57) ABSTRACT

A switching regulator includes a switching element, a first error amplification circuit amplifying a difference between a voltage based on an output voltage and a first reference voltage and providing a first error voltage, a clamp circuit generating a second error voltage at an output node based on the first error voltage and a second reference voltage, a PFM comparison circuit comparing the second error voltage and the second reference voltage to output a comparison result, an oscillation circuit providing and stopping a clock signal according to the comparison result, and a PWM conversion circuit turning on/off the switching element based on the second error voltage and the output of the oscillation circuit. The clamp circuit clamps a lower limit value of the second error voltage to a voltage obtained by subtracting a prescribed voltage from the second reference voltage.

6 Claims, 6 Drawing Sheets

(56) References Cited

U.S. PATENT DOCUMENTS

| | | | |
|---|---|---|---|
| 2009/0315523 A1 | 12/2009 | Kumagai et al. | |
| 2010/0066328 A1 | 3/2010 | Shimizu et al. | |
| 2015/0180335 A1* | 6/2015 | Takada | H02M 3/156 323/288 |
| 2015/0222180 A1* | 8/2015 | Deguchi | H02M 3/156 323/282 |
| 2015/0229210 A1* | 8/2015 | Takada | H02M 3/156 323/284 |
| 2017/0098992 A1* | 4/2017 | Weis | H02M 1/32 |
| 2017/0336818 A1* | 11/2017 | Gakhar | G05F 1/575 |
| 2018/0019671 A1* | 1/2018 | Li | H02M 1/083 |
| 2018/0183332 A1* | 6/2018 | Herzer | H02M 3/158 |

* cited by examiner

US 10,468,989 B2

SWITCHING REGULATOR INCLUDING A CLAMP CIRCUIT

RELATED APPLICATIONS

This application claims priority under 35 U.S.C. § 119 to Japanese Patent Application No. 2017-196188 filed on Oct. 6, 2017, the entire content of which is hereby incorporated by reference.

BACKGROUND OF THE INVENTION

1. Field of the Invention

The present invention relates to a switching regulator.

2. Description of the Related Art

FIG. 5 illustrates a circuit diagram of a related art switching regulator 500.

The related art switching regulator 500 is equipped with a power supply terminal 501, a ground terminal 502, a reference voltage source 510, an error amplification circuit 511, a reference voltage source 512, a PFM comparison circuit 513, an oscillation circuit 514, a PMOS transistor 530, an NMOS transistor 531, an inductor 540, a capacitor 541, resistors 543 and 544, an output terminal 542, and a PWM conversion circuit 550 including a current-voltage conversion circuit 520, a slope voltage generation circuit 521, a PWM comparison circuit 522, a control circuit 523, and a backflow detection circuit 524. These components are connected to each other as illustrated in the drawing to configure the switching regulator 500 (refer to, for example, Japanese Patent Application Laid-Open No. 2010-68671).

With such a configuration as shown above, a negative feedback loop functions so that the switching regulator 500 operates in such a manner that a voltage VFB obtained from dividing the voltage of the output terminal 542 by the resistors 543 and 544 becomes equal to a reference voltage VREF1 of the reference voltage source 510, to generate a prescribed output voltage VOUT at the output terminal 542.

Since the related art switching regulator 500 adopts a system of causing the PFM comparison circuit 513 to compare an error voltage VERR being an output of the error amplification circuit 511 with a reference voltage VREF2 of the reference voltage source 512 and enabling or disabling the oscillation circuit 514 according to a comparison result signal CMPF being an output from the PFM comparison circuit 513 to thereby switch between a PWM operation and a PFM operation, the switching regulator 500 is capable of entering the PFM operation when a load current IOUT flowing through an external load 50 connected between the output terminal 542 and the ground terminal is relatively small, and enhancing power conversion efficiency.

SUMMARY OF THE INVENTION

In the above related art switching regulator 500, the output voltage VOUT drops greatly against a sudden increase of the load current IOUT during the PFM operation.

Since the gain of the error amplification circuit in the switching regulator is generally set very large, the reason is that the error voltage VERR being the output of the error amplification circuit 511 is reduced to 0V during the PFM operation. Since the error voltage VERR reduces to 0V, a significant delay occurs until the error voltage VERR exceeds the reference voltage VREF2 from 0V to carry out the PWM operation during which the output voltage VOUT greatly reduces.

The reason will hereinafter be described in detail with a waveform diagram of FIG. 6.

FIG. 6 illustrates waveforms of the load current IOUT, a voltage VSW output from a drain of the PMOS transistor 530, an inductor current IL flowing through the inductor 540, the output voltage VOUT, the voltage VFB, the error voltage VERR, and the comparison result signal CMPF in the related art switching regulator 500. Further, the reference voltage VREF1 is indicated by a one-dot chain line superposed on the waveform of the voltage VFB. The reference voltage VREF2 is indicated by a one-dot chain line superposed on the waveform of the error voltage VERR, and 0V is indicated by a dotted line.

At the time t0, the comparison result signal CMPF is high level, and the switching regulator 500 is under PFM-operation. Thus, the PMOS transistor 530 and the NMOS transistor 531 stop the switching operation and are off. When the load current IOUT suddenly increases at the time t0 in this condition, the output voltage VOUT reduces correspondingly, and the voltage VFB also lowers. Then, the error voltage VERR begins to rise from 0V when the voltage VFB falls below the reference voltage VREF1.

Thereafter, the comparison result signal CMPF inverts to a low level when the error voltage VERR exceeds the reference voltage VREF2 at the time t1. Thus, the PMOS transistor 530 and the NMOS transistor 531 start the switching operation to make flow of the inductor current IL, thereby turning the output voltage VOUT to rise. Thus, a delay time DT occurs from the times t0 to t1, i.e., from the sudden increase in the load current IOUT to the start of the switching operation by the PMOS transistor 530 and the NMOS transistor 531. Accordingly, the output voltage VOUT greatly drops.

The present invention is made to provide a switching regulator capable of suppressing a substantial reduction in output voltage against sudden increase of a load current during the PFM operation.

According to one aspect of the present invention there is provided a switching regulator which generates a prescribed output voltage at an output terminal from a power supply voltage supplied to a first power supply terminal, including: an inductor having one end connected to the output terminal; a switching element connected between the first power supply terminal and the other end of the inductor; a first error amplification circuit configured to amplify a difference between a voltage based on the output voltage and a first reference voltage and output a first error voltage; a clamp circuit configured to generate a second error voltage at an output node, based on the first error voltage supplied to a first input node and a second reference voltage supplied to a second input node, the clamp circuit clamping a lower limit value of the second error voltage to a voltage obtained by subtracting a prescribed voltage from a voltage of the second reference voltage; a PFM comparison circuit configured to compare the second error voltage supplied to a first input terminal and the second reference voltage supplied to a second input terminal and output a comparison result signal of a first or second level; an oscillation circuit configured to output a clock signal of a prescribed frequency with respect to the comparison result signal of the first level and stop the output of the clock signal with respect to the comparison result signal of the second level; and a PWM conversion circuit configured to turn on/off the switching element with a desired pulse width, based on the second error voltage and the output of the oscillation circuit.

According to a switching regulator of the present invention, a lower limit value of the second error voltage supplied to the first input terminal of the PFM comparison circuit is clamped to a voltage obtained by subtracting the prescribed voltage from the second reference voltage. That is, the lower limit value of the voltage supplied to the first input terminal of the PFM comparison circuit can be set to a voltage closer to the second reference voltage from 0V. Thus, the transition from the PFM operation to the PWM operation can be performed in a short period of time against a sudden increase of the load current during the PFM operation. Accordingly, it is possible to suppress the large drop of the output voltage.

DETAILED DESCRIPTION OF THE PREFERRED EMBODIMENTS

Embodiments of the present invention will hereinafter be described with reference to the accompanying drawings.

Figure 1:
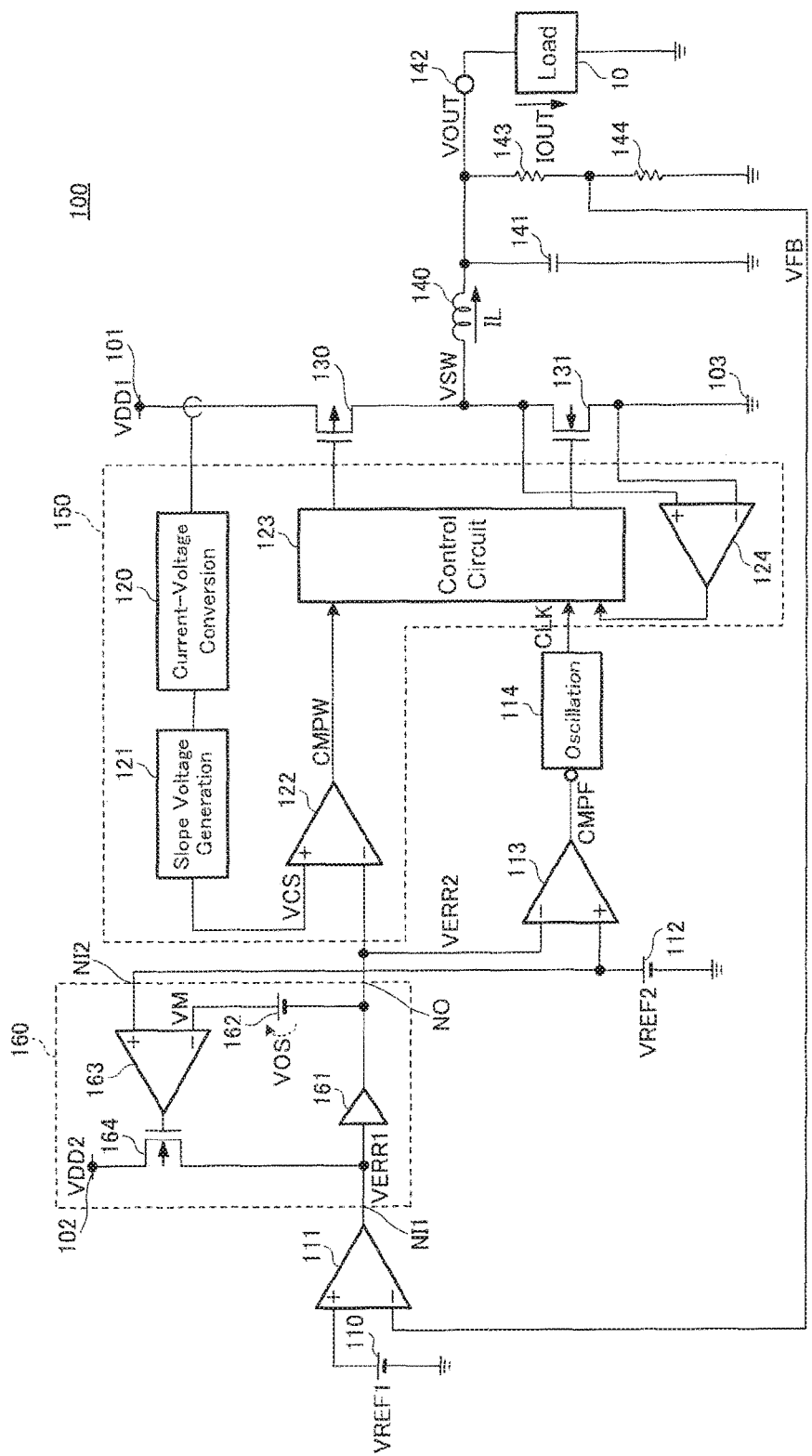
FIG. 1 is a circuit diagram illustrating a switching regulator according to the first embodiment of the present invention.

FIG. 1 is a circuit diagram of a switching regulator 100 according to a first embodiment of the present embodiment.

The switching regulator 100 according to the present embodiment is equipped with a power supply terminal 101 supplied with a power supply voltage VDD1, a power supply terminal 102 supplied with a power supply voltage VDD2, a ground terminal 103, a reference voltage source 110, an error amplification circuit 111, a reference voltage source 112, a PFM comparison circuit 113, an oscillation circuit 114, a PMOS transistor 130 (also called a "switching element"), an NMOS transistor 131 (also called a "synchronous rectification element"), an inductor 140, a capacitor 141, resistors 143 and 144, an output terminal 142, a PWM conversion circuit 150 including a current-voltage conversion circuit 120, a slope voltage generation circuit 121, a PWM comparison circuit 122, a control circuit 123 and a backflow detection circuit 124, and a clamp circuit 160.

The clamp circuit 160 has a buffer circuit 161 having an input connected to an input node NI1, a constant voltage generator 162 having one end connected to the output of the buffer circuit and an output node NO, an error amplification circuit 163 having an inversion input terminal connected to the other end of the constant voltage generator 162, and a non-inversion input terminal connected to an input node NI2, and an NMOS transistor 164 having a gate connected to an output of the error amplification circuit 163, a drain connected to the power supply terminal 102, and a source connected to the input node NI1.

The reference voltage source 110 has one end connected to a non-inversion input terminal of the error amplification circuit 111, and the other end connected to the ground terminal 103. The error amplification circuit 111 has an inversion input terminal connected to a connection point of the resistors 143 and 144, and an output connected to the input node NI1 of the clamp circuit 160. The clamp circuit 160 has the input node NI1 connected to the output of the error amplification circuit 111, the input node NI2 connected to one end of the reference voltage source 112, and the output node NO connected to an inversion input terminal of the PFM comparison circuit 113 and an inversion input terminal of the PWM comparison circuit 122. One end of the reference voltage source 112 is connected to a non-inversion input terminal of the PFM comparison circuit 113, and the other end thereof is connected to the ground terminal 103. The PFM comparison circuit 113 has an output connected to an input of the oscillation circuit 114. The oscillation circuit 114 has an output connected to an input of the control circuit 123.

The slope voltage generation circuit 121 has an input connected to an output of the current-voltage conversion circuit 120 and an output connected to a non-inversion input terminal of the PWM comparison circuit 122. The PWM comparison circuit 122 has an output connected to an input of the control circuit 123. The PMOS transistor 130 has a source connected to the power supply terminal 101 and an input of the current-voltage conversion circuit 120, a gate connected to an output of the control circuit 123, and a drain connected to one end of the inductor 140, a non-inversion input terminal of the backflow detection circuit 124, and a drain of the NMOS transistor 131. The NMOS transistor 131 has a gate connected to the output of the control circuit 123 and a source connected to the ground terminal 103. The backflow detection circuit 124 has an inversion input terminal connected to the ground terminal 103 and an output connected to an input of the control circuit 123.

The inductor 140 has the other end connected to one end of the capacitor 141, one end of the resistor 143, and the output terminal 142. The other end of the capacitor 141 is connected to the ground terminal 103. The other end of the resistor 144 is connected to the ground terminal 103.

The operation of the switching regulator 100 configured as described above will be described below.

The error amplification circuit 111 compares a voltage VFB obtained by dividing an output voltage VOUT of the output terminal 142 by the resistors 143 and 144 with a reference voltage VREF1 of the reference voltage source 110 to output an error voltage VERR1.

The clamp circuit 160 generates an error voltage VERR2 at the output node NO, based on the error voltage VERR1 supplied to the input node NI1 and a reference voltage VREF2 of the reference voltage source 112 supplied to the input node NI2. Specifically, the output impedance of the buffer circuit 161 is set lower than that of the error amplification circuit 111. The buffer circuit 161 generates the error voltage VERR2 proportional to the error voltage VERR1 at the output node NO. The constant voltage generator 162 generates a constant voltage VOS. The error amplification circuit 163 compares a voltage VM obtained by adding the constant voltage VOS to the error voltage VERR2 with the reference voltage VREF2 to obtain an output voltage which is provided to the gate of the NMOS transistor 164. Thus, the clamp circuit 160 clamps the error voltage VERR2 to a voltage lower than the reference voltage VREF2 by the constant voltage VOS when the voltage VM is smaller than the reference voltage VREF2.

The current-voltage conversion circuit 120 converts a source current of the PMOS transistor 130 to a voltage and outputs the same to the slope voltage generation circuit 121. The slope voltage generation circuit 121 adds a sawtooth wave to the output of the current-voltage conversion circuit 120 and outputs a voltage VCS. The PWM comparison circuit 122 compares the error voltage VERR2 with the voltage VCS to output a comparison result signal CMPW to the control circuit 123.

The PFM comparison circuit 113 compares the reference voltage VREF2 of the reference voltage source 112 and the error voltage VERR2 and thereby outputs a comparison result signal CMPF to the oscillation circuit 114. When the comparison result signal CMPF is at a low level, the oscillation circuit 114 oscillates (is enabled) at a prescribed frequency and provides a clock signal as an output signal CLK. Further, when the comparison result signal CMPF is high level, the oscillation circuit 114 stops the oscillation (is disabled) and fixes the output signal CLK to a low level.

The backflow detection circuit 124 compares drain and source voltages of the NMOS transistor 131. When the drain voltage becomes higher than the source voltage, the backflow detection circuit 124 outputs a reverse current detection signal to the control circuit 123.

The control circuit 123 controls on/off of the PMOS transistor 130 and the NMOS transistor 131 in accordance with each signal input thereto.

The inductor 140 and the capacitor 141 smooth an output voltage VSW from the drain of the PMOS transistor 130.

Since a negative feedback loop functions with such a circuit configuration, the switching regulator 100 operates in such a manner that the voltage VFB becomes equal to the reference voltage VREF1, generating the output voltage VOUT at the output terminal 142.

In the switching regulator 100, a PWM (Pulse Width Modulation) operation and a PFM (Pulse Frequency Modulation) operation are switched in the following manner according to the magnitude of a load current IOUT flowing through a load 10 connected to the output terminal 142.

When the load current is large, the error voltage VERR1, i.e., the error voltage VERR2 raises to compensate the drop in the output voltage VOUT. Accordingly, the error voltage VERR2 becomes constantly larger than the reference voltage VREF2, and the oscillation circuit 114 continues to output a clock signal of a prescribed frequency as the output signal CLK. In synchronization with the rising of the clock signal, the PWM conversion circuit 150 turns on the PMOS transistor 130 and turns off the NMOS transistor 131. At this time, the pulse width of a signal to control the on time of the PMOS transistor 130 is determined by the PWM conversion circuit 150. Thus, the switching regulator 100 is brought into a PWM operation when the load current IOUT is large.

Thereafter, when the load current IOUT becomes small from the above condition, the error voltage VERR2 continues to hold the condition of being constantly larger than the reference voltage VREF2 immediately after the load current IOUT becomes small. Since the load current IOUT, however, becomes small and a reduction in the output voltage VOUT due to the load current IOUT is low, a rise in the output voltage VOUT by the turning on of the PMOS transistor 130 becomes large. Accordingly, the error voltage VERR2 reduces to compensate the rise in the output voltage VOUT and becomes a voltage lower than the reference voltage VREF2. Thus, the PMOS transistor 130 turns off so that the output voltage VOUT gradually reduces.

Further, when the error voltage VERR2 increases and becomes larger than the reference voltage VREF2, the oscillation circuit 114 outputs a clock signal as the output signal CLK. In synchronization with the rising of the clock signal, the PWM conversion circuit 150 turns on the PMOS transistor 130 and turns off the NMOS transistor 131. At this time, since the load current IOUT is small, the output voltage VOUT exceeds a desired voltage soon after the turning on of the PMOS transistor 130, so that the error voltage VERR2 reduces. Then the PWM conversion circuit 150 turns off the PMOS transistor 130 and turns on the NMOS transistor 131. Further, the oscillation circuit 114 fixes the output signal CLK to low level. Thus, when the load current IOUT is small, the oscillation circuit 114 repeats the oscillation and stop. That is, the switching regulator 100 takes a PFM operation.

Thus, the switching regulator 100 according to the present embodiment is capable of entering the PFM operation when the load current IOUT is small, and enhancing power conversion efficiency.

In order to describe the characteristic configuration of the switching regulator 100 according to the present embodiment, the circuit operation against the sudden increase of the load current IOUT during the PFM operation, will be described in detail below.

Figure 2:
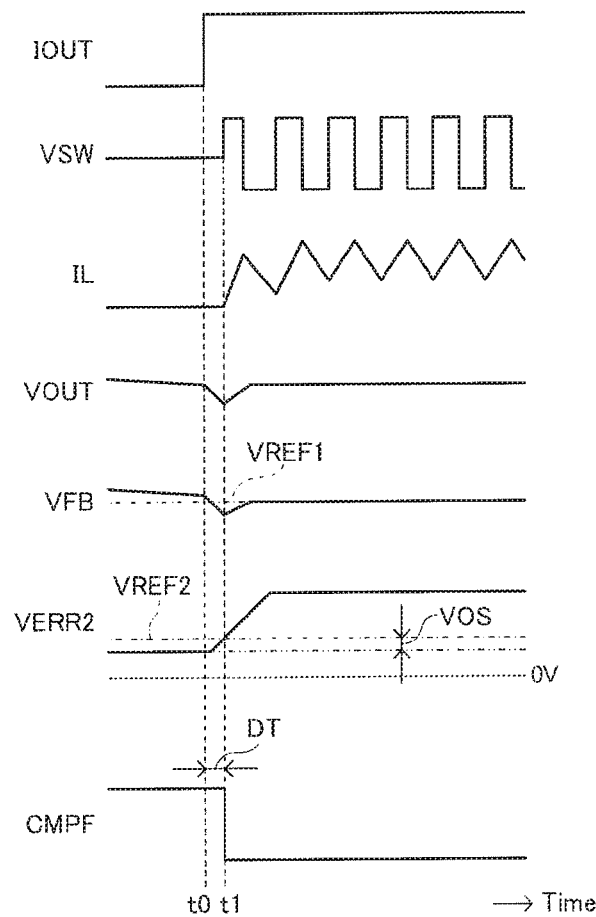
FIG. 2 is a diagram illustrating a signal waveform of each node of the switching regulator illustrated in FIG. 1.

FIG. 2 illustrates the waveforms of the load current IOUT, voltage VSW, inductor current IL flowing through the inductor 140, output voltage VOUT, voltage VFB, error voltage VERR2, and comparison result signal CMPF in the switching regulator 100 according to the present embodiment. Further, the reference voltage VREF1 is indicated by a one-dot chain line in superposition on the waveform of the voltage VFB. The reference voltage VREF2 is indicated by a one-dot chain line in superposition on the waveform of the error voltage VERR2, and 0V is indicated by a dotted line.

At time t0, the comparison result signal CMPF is high level, and the switching regulator 100 is in PFM operation. Thus, the PMOS transistor 130 and the NMOS transistor 131 stop the switching operation and are off. At this time, since the voltage VFB is higher than the reference voltage VREF1, the error amplification circuit 111 tries to output a low voltage (0V) as the error voltage VERR1. However, since the clamp circuit 160 clamps the error voltage VERR2 to a voltage lower by the constant voltage VOS than the reference voltage VREF2 when the voltage VM becomes smaller than the reference voltage VREF2 as described above, the error voltage VERR2 (error voltage VERR1) becomes a voltage lower than the reference voltage VREF2 and higher than 0V.

When the load current IOUT suddenly increases at the time t0 in the above-described state, the output voltage VOUT drops correspondingly, and the voltage VFB also decreases. Then, the error voltage VERR2 begins to rise from the voltage lower by the constant voltage VOS than the reference voltage VREF2 when the voltage VFB falls below the reference voltage VREF1.

Thereafter, when the error voltage VERR2 exceeds the reference voltage VREF2 at time t1, the comparison result signal CMPF inverts to low level. Thus, the PMOS transistor 130 and the NMOS transistor 131 start the switching operation to make the inductor current IL flow, thereby turning the output voltage VOUT to rise.

Thus, the switching regulator 100 according to the present embodiment operates to clamp the lower limit value of the error voltage VERR2 to a voltage obtained by subtracting the constant voltage VOS from the reference voltage VREF2, thereby making it possible to shorten a delay time DT from the time t0 to the time t1, i.e., from the sudden increase in the load current IOUT during the PFM operation to the transition to the PWM operation. Accordingly, it is possible to suppress the large drop of the output voltage VOUT.

Figure 3:
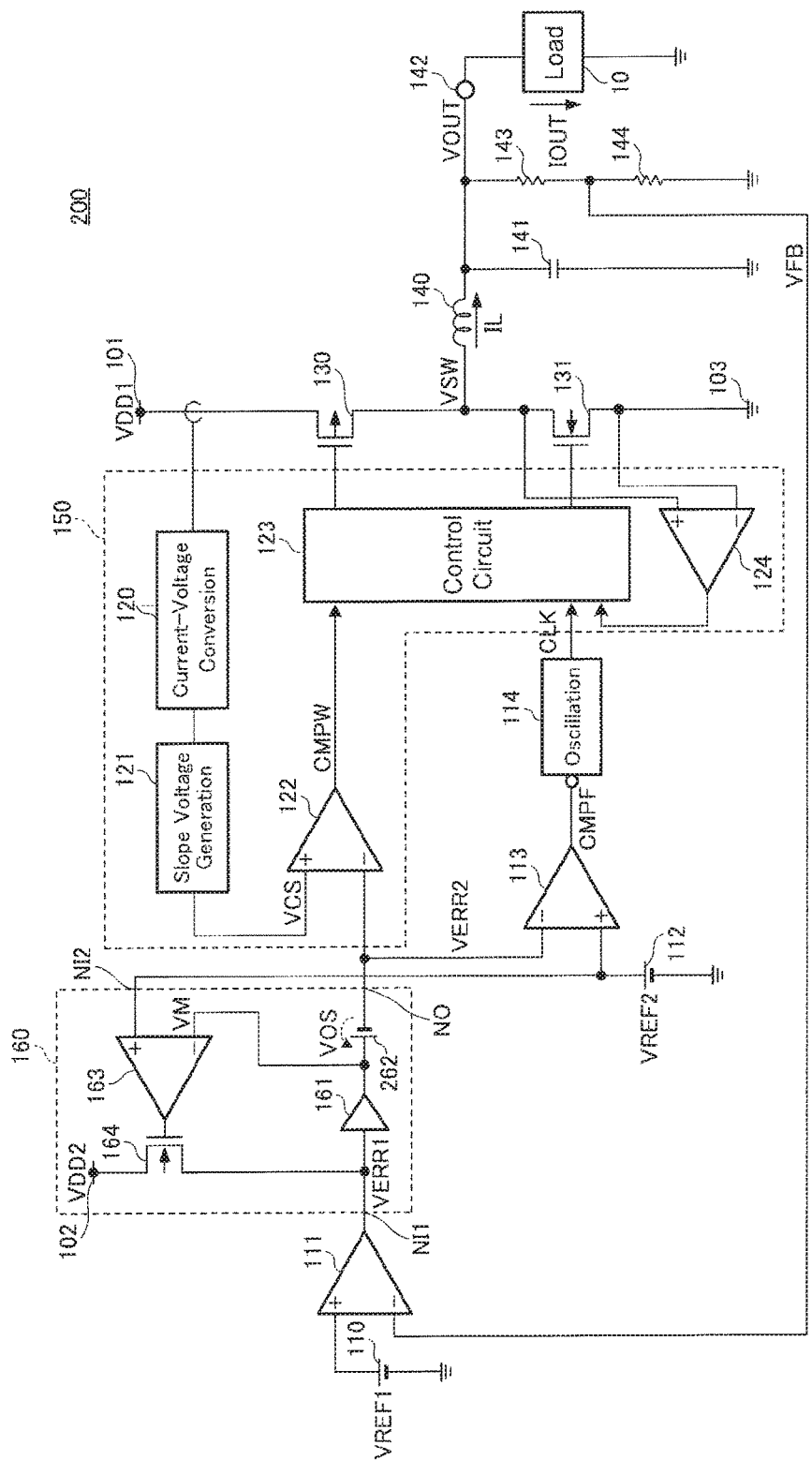
FIG. 3 is a circuit diagram illustrating a switching regulator according to the second embodiment of the present invention.

A switching regulator 200 according to a second embodiment of the present invention will next be described with reference to FIG. 3.

The switching regulator 200 according to the present embodiment has a configuration in which the constant voltage generator 162 connected between the inversion input terminal of the error amplification circuit 163 and the output node NO in the clamp circuit 160 of the switching regulator 100 according to the first embodiment is deleted, and instead, a constant voltage generator 262 is connected between the output of the buffer circuit 161 and the output node NO thereof. Since other configurations are the same as those in the switching regulator 100 of FIG. 1, the same components are denoted by the same reference numerals, and their dual description will be omitted as appropriate.

With the above-described configuration, the switching regulator 200 according to the present embodiment also operates to clamp the lower limit value of the error voltage VERR2 to a voltage obtained by subtracting the constant voltage VOS from the reference voltage VREF2 as with the switching regulator 100 according to the first embodiment. Thus, even when a load current IOUT suddenly increases during PFM operation, it is possible to shorten a delay time DT from the sudden increase in the load current IOUT to transition to PWM operation and suppress the large drop of the output voltage VOUT.

Figure 4:
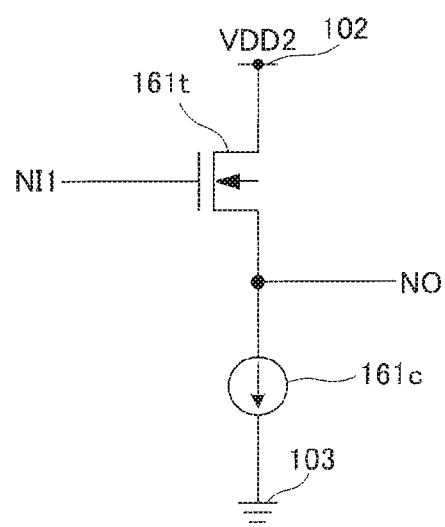
FIG. 4 is a circuit diagram illustrating a specific example of a buffer circuit illustrated in each of FIGS. 1 and 3.
Figure 5:
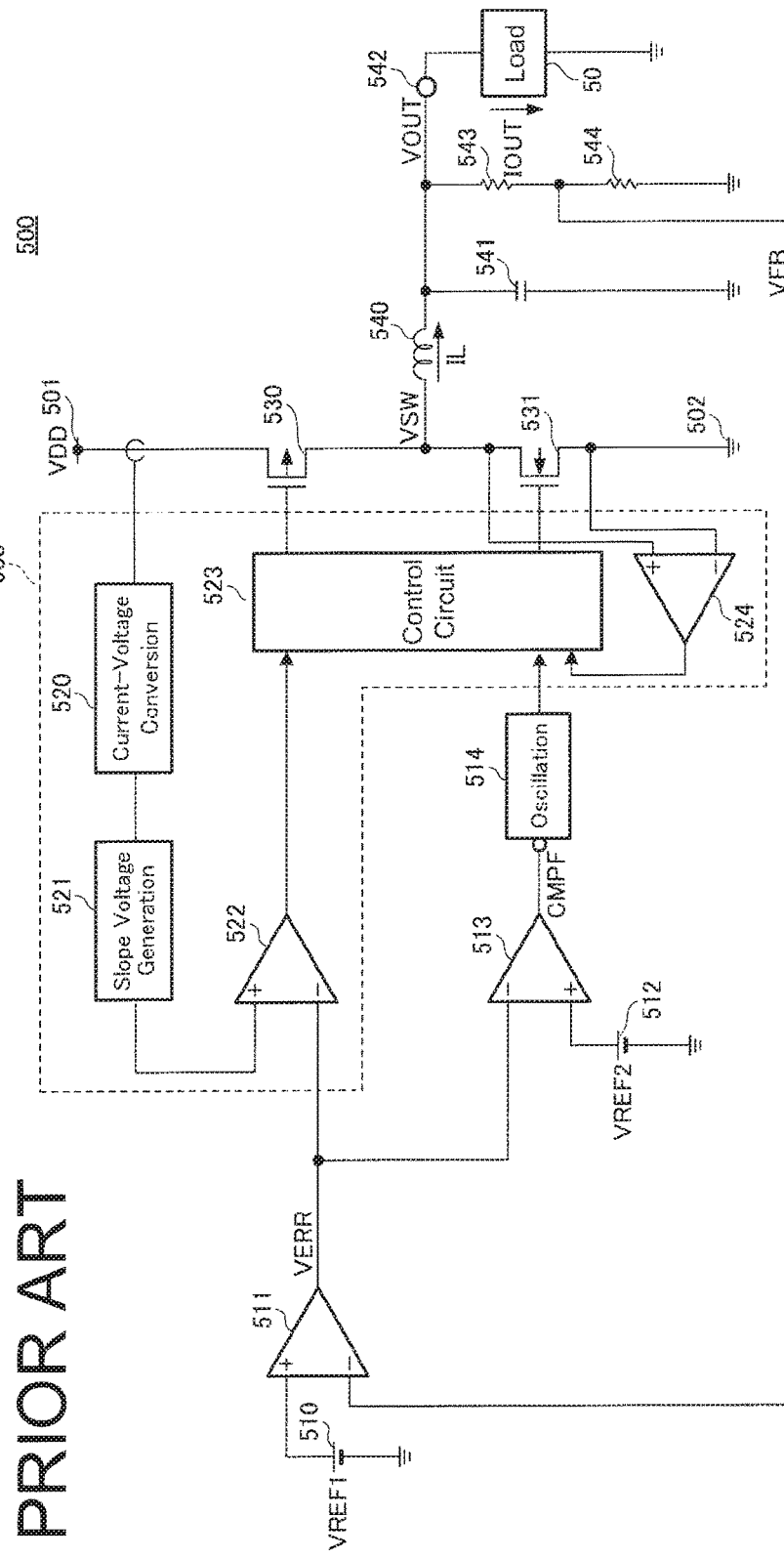
FIG. 5 is a circuit diagram of a related art switching regulator.
Figure 6:
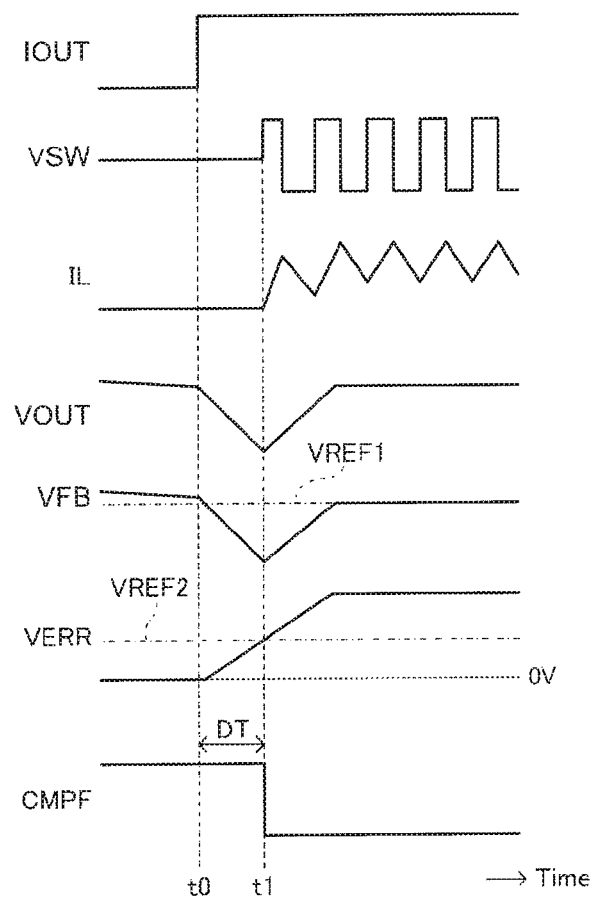
FIG. 6 is a diagram illustrating a signal waveform of each node of the switching regulator in FIG. 5.

FIG. 4 illustrates a specific example of the buffer circuit 161 in each of the first and second embodiments. The buffer circuit 161 includes an NMOS transistor 161t having a drain connected to a power supply terminal 102, a source connected to the output node NO of the clamp circuit 160, and a gate connected to the input node NI1 of the clamp circuit 160, and a constant current source 161c connected between the output node NO and the ground terminal 103. The buffer circuit 161 is thus configured from a source follower circuit.

According to the configuration, a buffer circuit having low output impedance can be realized with less number of elements.

Although the embodiments of the present invention have been described above, the present invention is not limited to the above embodiments. It is needless to say that the invention may be modified in various ways within the scope not departing from the spirit of the present invention.

For example, so long as the constant voltage generator 162 and 262 are capable of generating the constant voltage in the above embodiments, their configurations are not limited in particular.

Also, although the above embodiment has been described by taking for example, the switching regulator of the current mode control system, the present invention is applicable even to a switching regulator of a voltage mode control system.

Further, although the above embodiment has described the example using the MOS transistors as the switching element and as the synchronous rectification element, a bipolar transistor or the like may be used.

Besides, although the above embodiment has been described by taking for example, the switching regulator of synchronous rectification, the present invention is applicable even to a switching regulator of diode rectification. Incidentally, in the switching regulator of diode rectification, no backflow detection circuit is required.

What is claimed is:

1. A switching regulator which generates a prescribed output voltage at an output terminal from a power supply voltage supplied to a first power supply terminal, comprising:
    an inductor having one end connected to the output terminal;
    a switching element connected between the first power supply terminal and another end of the inductor;
    a first error amplification circuit configured to amplify a difference between a voltage based on the output voltage and a first reference voltage and output a first error voltage;
    a clamp circuit configured to generate a second error voltage at an output node, based on the first error voltage supplied to a first input node and a second reference voltage supplied to a second input node, the clamp circuit clamping a lower limit value of the second error voltage to a voltage lower by a prescribed voltage from a voltage of the second reference voltage;
    a PFM comparison circuit configured to compare the second error voltage supplied to a first input terminal and the second reference voltage supplied to a second input terminal and output a comparison result signal of a first or second level;
    an oscillation circuit configured to output a clock signal of a prescribed frequency with respect to the comparison result signal of the first level and stop the output of the clock signal with respect to the comparison result signal of the second level; and
    a PWM conversion circuit configured to turn on/off the switching element with a desired pulse width, based on the second error voltage and the output of the oscillation circuit;
wherein the clamp circuit comprises:
    a buffer circuit whose input is connected to the first input node, and whose output is connected to the output node;
    a constant voltage generator having a first end connected to the output node, and generating a constant voltage;
    a second error amplification circuit configured to amplify a difference between a voltage at a second end of the constant voltage generator and the second reference voltage; and
    a MOS transistor connected between a second power supply terminal and the first input node, and having a gate connected to an output of the second error amplification circuit, and
wherein the prescribed voltage is the constant voltage.

2. The switching regulator according to claim 1, wherein the constant voltage generator is connected between the output node and a terminal of the second error amplification circuit which is supplied with the voltage at the second end of the constant voltage generator.

3. The switching regulator according to claim 1, wherein the constant voltage generator is connected between the output of the buffer circuit and the output node.

4. The switching regulator according to claim 1, wherein the buffer circuit comprises a source follower circuit.

5. The switching regulator according to claim 2, wherein the buffer circuit comprises a source follower circuit.

6. The switching regulator according to claim 3, wherein the buffer circuit comprises a source follower circuit.

\* \* \* \* \*